United States Patent [19]

Alling

[11] Patent Number: 5,189,791
[45] Date of Patent: Mar. 2, 1993

[54] METHOD FOR MAKING A RETAINER HAVING ENHANCED ROLLER RETENTION

[75] Inventor: Richard L. Alling, Torrington, Conn.

[73] Assignee: The Torrington Company, Torrington, Conn.

[21] Appl. No.: 711,502

[22] Filed: Jun. 3, 1991

Related U.S. Application Data

[62] Division of Ser. No. 585,466, Sep. 20, 1990, abandoned.

[51] Int. Cl.⁵ ............................................. F16C 33/00
[52] U.S. Cl. ........................... 29/898.067; 29/898.065; 29/557; 384/572
[58] Field of Search .................. 29/898.065, 898.067, 29/557, 558; 384/572–580

[56] References Cited

U.S. PATENT DOCUMENTS

| | | | |
|---|---|---|---|
| 1,911,544 | 5/1933 | Beard | 384/578 |
| 1,928,823 | 10/1933 | Young | 384/577 |
| 2,106,127 | 1/1938 | Slusser | 384/575 |
| 3,075,278 | 1/1938 | Bratt | 384/579 |
| 3,199,935 | 8/1965 | Pitner | 384/573 |
| 3,202,467 | 8/1965 | Eckstein | 384/579 |
| 3,535,964 | 10/1970 | Ahlman | 29/898.067 |
| 3,707,753 | 1/1973 | Bailey, Jr. | 29/898.067 |
| 3,878,705 | 4/1975 | Iffland | 29/898.067 X |
| 3,992,764 | 11/1976 | Serasio | 29/898.067 |
| 4,689,982 | 9/1987 | Olschewski et al. | 29/898.067 X |
| 4,767,224 | 8/1988 | Bauer et al. | 384/572 |
| 4,978,237 | 12/1990 | Motohashi et al. | 29/898.067 X |

FOREIGN PATENT DOCUMENTS

| | | | |
|---|---|---|---|
| 1082087 | 5/1960 | Fed. Rep. of Germany | 384/572 |
| 637155 | 3/1962 | Italy | 384/572 |

Primary Examiner—Joseph M. Gorski
Assistant Examiner—S. Thomas Hughes
Attorney, Agent, or Firm—John C. Bigler; Michael H. Minns

[57] ABSTRACT

A retainer for use with a needle roller bearing having crossbars with an inverted trapezoidal shape such that the cross bars shape increases roller retention. A method for manufacturing the enhanced retention retainer is described which also eliminates the need for post piercing burr removal.

3 Claims, 1 Drawing Sheet

METHOD FOR MAKING A RETAINER HAVING ENHANCED ROLLER RETENTION

This application is a divisional of application Ser. No. 585,466, filed Sept. 20, 1990, now abandoned.

BACKGROUND OF THE INVENTION

This invention relates generally to an antifriction roller bearing cage structure and more particularly to a cage structure having a crossbar which enhances roller retention and a method for making the enhanced retention retainer.

A typical retainer for needle bearings uses a crossbar having an approximate trapezoidal shape. The sides of the crossbar are angled away from the rollers and toward the center of the bearing housing. Such a configuration results in minimal retention of the roller. As the roller moves toward the center of the bearing, the distance between adjacent retainer crossbars becomes larger because of the angle of the crossbar sides away from the rollers.

The common method for manufacturing needle bearing retainers is to use a slot pierce operation on a blank strip of metal. A plurality of slots are pierced in the strip. Typically the piercing is done from the outer radial side of the strip. After the slots have been pierced in the strip, the strip is cut off to the desired length, the cutoff strip is wrapped into the circular shape of the retainer and the ends are welded together. This results in any burr from the piercing operation being on the inner radial surface of the retainer where the burrs can score and damage the shaft. Customary burr removal techniques involve chemical milling or tumble processing, either of which consume time in the manufacturing cycle and require control of effluent discharges.

The foregoing illustrates limitations known to exist in present needle bearing retainers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a retainer having enhanced roller retention and a method for making the retainer.

A method of forming a needle bearing retainer from a thin strip of metal, said strip having an first surface and a second surface, comprising the steps of: piercing with a piercing tool a plurality of slots in said strip, forming a plurality of crossbars said crossbars having edges adjacent said slots, said piercing tool entering said strip first surface and exiting said strip second surface; wiping the edges of said crossbars with a chambered wedge shaped tool from the second surface toward the first surface; cutting off a section of said strip; and forming said cutoff section in a circular shape whereby the second surface of said strip forms the outer radial surface of said circular shaped strip.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

A typical needle bearing retainer is comprised of two end rims 11, 12 which are connected by multiple crossbars 20.

Figure 1A:
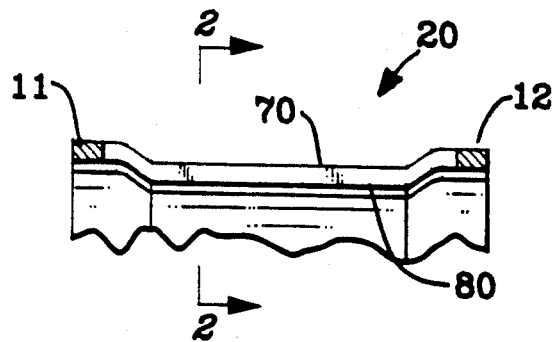
FIG. 1A is a side view showing a crossbar of the prior art retainer.
Figure 1B:
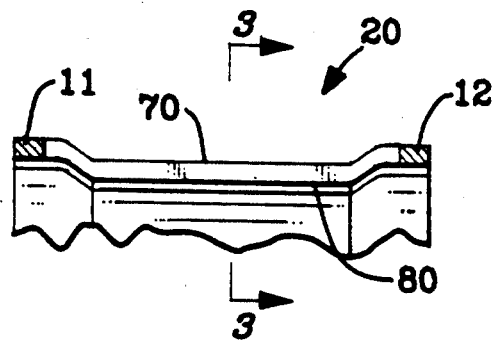
FIG. 1B is a side view showing a crossbar of the present invention.

The end rims 11, 12 and the crossbars 20 define pockets which limit radial movement of the bearing rollers 60. FIG. 1A shows a side view of a typical retainer crossbar 20. The upper side of the crossbar 20 as shown in FIG. 1 is the outer radial surface of the retainer.

Figure 2:
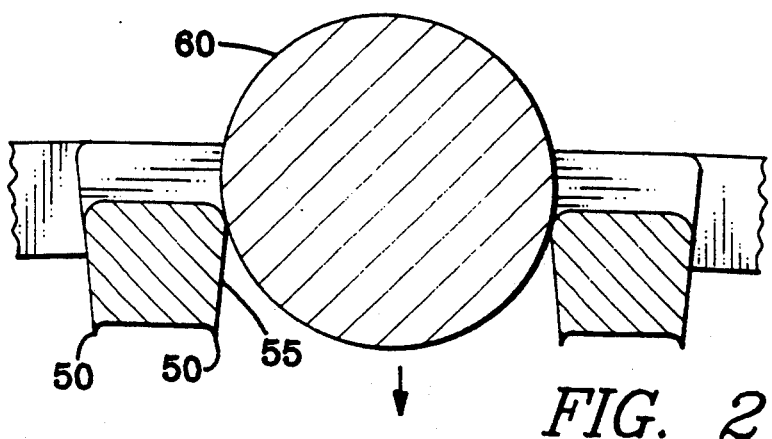
FIG. 2 is a cross section (along the lines 2—2 of FIG. 1A) of a prior art crossbar and roller.

FIG. 2 shows a cross section of a prior art retainer cross-bar 20 in relation to a roller 60. The crossbar 20 cross-section has an approximate trapezoidal shape. The sides 55 of the crossbar are angled away from the roller 60. As can be seen in FIG. 2, if the roller 60 moves toward the center of the bearing (as indicated by the arrow) the distance between adjacent crossbars increases. In extreme cases, the roller 60 can lose contact with the crossbar so that the retainer does not provide any retention for the rollers 60.

Figure 3:
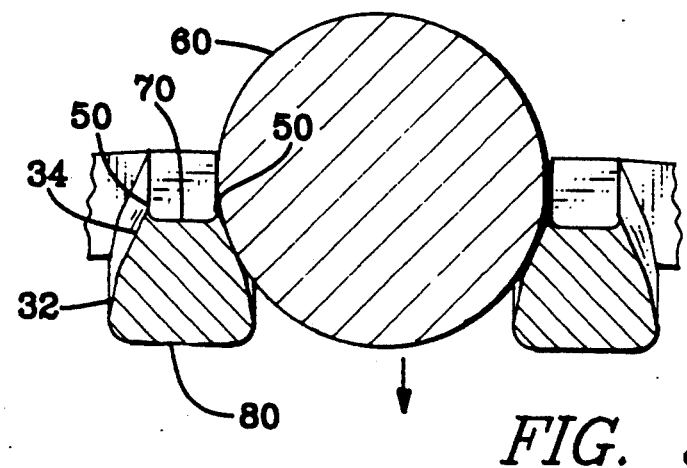
FIG. 3 is a cross section (along the lines 3—3 of FIG. 1B) of a crossbar of the present invention and roller.

FIG. 3 shows a cross section of the crossbar 20 of the present invention. The crossbar cross section of the present invention also has an approximate trapezoidal shape. The trapezoid is inverted from the trapezoid of the prior art. In addition, the sides of the crossbar cross section are formed of two surfaces. The second side surface 34, adjacent to the outer radial surface 70 of the crossbar 20, is angled further away from the roller than the first side surface 32. The interior angle of the first side surface 32 to the second side surface 34 is less than 180 degrees. As a result, when the roller 60 moves toward the center of the bearing as indicated by the arrow in FIG. 3, the distance between adjacent crossbars 20 decreases, thus retaining the roller between the crossbars 20.

This increased retention is important because if the rollers 60 can move too far toward the center (or interior) of the bearing, the ends of the rollers 60 can interfere with the installation of a shaft within the bearing.

Prior art retainers are typically formed by piercing slots in a flat steel strip with a piercing tool from the outer radial surface. This results in burrs 50 being left on the corners of the inner radial surface, as shown in FIG. 2. Since the retainer normally contacts the shaft, these burrs 50 can score and damage the shaft. It is necessary to remove the burrs 50 prior to installing the needle bearing on the shaft. The burrs 50 are removed by chemical processing or tumble processing. Either method adds cost to the retainer fabrication and requires control of effluent discharges.

The increased angle of the second side surface 34 moves the burrs 50 to a position where the burrs 50 cannot contact the shaft, the rollers 60 or the bearing cup (not shown). With an enhanced retention retainer of the present invention, the burrs 50 do not need to be removed. This eliminates a costly manufacturing process and also eliminates the concern of any effluent control.

The preferred method for manufacturing the enhanced retention retainer starts with the same type of flat steel strip as used in prior methods. Multiple slots are pierced in the strip from the side of the strip that will become the inner radial surface of the retainer. The piercing operation forms a crossbar 20 with a trapezoidal shape with straight sides. The portion of the sides adjacent to the inner radial surface 80 will become the first side surface 32. The slotted strip is then wiped with a chamfered wedge shaped tool from the side of the strip that will become the outer radial surface 70. This wiping process forms the second side surface 34. The shape of the chamfered wedge tool determines the interior angle between the first side surface 32 and the second side surface 34. The slotted chamfered strip is then cut to the desired length. The cut strip is wrapped in a circular shape so that the inner radial surface 80 is adjacent to the shaft. As needed, the circular strip ends are then welded together.

Having described the invention, what is claimed is:

1. A method of forming a roller bearing retainer from a thin strip of metal, said strip having a first surface and a second surface, comprising the steps of:

piercing with a piercing tool a plurality of slots in said strip, forming a plurality of crossbars, said crossbars having side surfaces adjacent said slots, said piercing tool entering said strip first surface and exiting said strip second surface;

removing said piercing tool from said strip;

reforming the side surfaces of said crossbars with a wedge shaped tool directed through the second surface toward the first surface such that said side surfaces are altered and burrs formed by the piercing the step are moved away from bearing members;

cutting off a section of said strip; and forming said cutoff section into a circular shaped strip whereby the second surface of said strip forms an outer radial surface of said circular shaped strip.

2. The method of claim 1 further comprising welding the ends of said cutoff section one to the other.

3. The method of claim 1 wherein the piercing step forms crossbars having a substantially trapezoidal shape in cross section, the crossbars having angled straight sides, and wherein the reforming step results in a chamfered surface adjacent the second surface having an increased angle relative to the angle of said straight sides.

* * * * *